UNITED STATES PATENT OFFICE.

FRANZ VON KÜGELGEN, OF HOLCOMBS ROCK, VIRGINIA, AND GEORGE O. SEWARD, OF EAST ORANGE, NEW JERSEY, ASSIGNORS, BY MESNE ASSIGNMENTS, TO COLUMBIA-KNICKERBOCKER TRUST COMPANY, TRUSTEE, A CORPORATION OF NEW YORK.

PROCESS OF DETINNING.

14,070. Specification of Reissued Letters Patent. Reissued Feb. 15, 1916.

No Drawing. Original No. 851,946, dated April 30, 1907, Serial No. 365,603. Application for reissue filed August 27, 1907. Serial No. 390,412.

DIVISION A.

*To all whom it may concern:*

Be it known that we, FRANZ VON KÜGELGEN, a subject of the German Emperor, residing at Holcombs Rock, county of Bedford, and State of Virginia, and GEORGE O. SEWARD, a citizen of the United States, residing at East Orange, county of Essex, and State of New Jersey, have jointly invented certain new and useful Improvements in Processes of Detinning, of which the following is a specification.

This invention aims to economically recover the tin from tin scrap.

In our application No. 189,272, filed January 16, 1904, (Patent No. 915,029, granted March 9, 1909) we have described a process of detinning wherein the scrap is placed in a vessel and dry chlorin is admitted thereto, attacking the tin and forming stannic chlorid, which is condensed upon the walls of the vessel. It is essential to the success of this process that the temperature be carefully controlled and maintained within narrow limits. The reaction is attended by generation of heat, so that the temperature rises rapidly. The temperature must always be kept below the point at which iron-chlorid is formed. If, however, to avoid this result the temperature is kept too low, the detinning is slow and not so complete as it should be. In order to secure a good practical result, it is advisable to keep the temperature as high as possible, but always below the temperature at which the iron is attacked. In our said application we have described a means of avoiding the objectionable overheating, while keeping the temperature high enough for efficiency; namely, by limiting the amount of chlorin introduced, the inflow of chlorin being varied according to the temperature, so as to keep the heat up near to, but always below, the prohibitive point. Auxiliary to this is the external cooling of the vessel, as by the application of a water jacket, which hastens the process and gives further control of the temperature.

In our original Letters Patent, of which the present specification is one of two divisions, we have described another means of keeping the temperature within control; namely, by limiting the amount of tin scrap proportionally to the volume of the vessel or reaction chamber. Thus we control the reaction, and consequently the heat of reaction, by limiting the proportion of tin, instead of by limiting the proportion of chlorin. We also apply by preference external cooling, as by a water jacket. This method is not herein claimed, being made the subject of a divisional reissue.

The present invention provides another way of controlling the temperature so that the iron is not attacked, which is as follows:—Instead of limiting the amount of chlorin or amount of scrap used in a vessel of a given size, we use at once such a powerful current of chlorin that the same is present in great excess above the reactive proportion. The chlorin is passed through in such a large volume that the current of cool gas flowing through the detinning tank exerts a cooling action on the contents.

The heat of the reaction is carried away by the stream of chlorin and the temperature is thus kept so low that the iron of the scrap is not attacked.

In practising our invention we put a suitable quantity of tin scrap into a chamber of given size and introduce dry chlorin therein into in a suitable current or stream sufficient to carry away the heat generated by the reaction. It is impossible to lay down any definite limits of proportion for the successful practice of our invention; but for a successful result the flow of the gas within the vessel must be sufficiently active to efficiently carry away the heat from the surfaces of the tin scrap where it is generated by the reaction; and this must be maintained so long as the reaction continues to generate heat at such rate as to run the temperature above the prohibitive point. In order that the scrap shall be completely and uniformly detinned it is necessary that there be an excess of chlorin above the reactive proportion, since the last residue of tin is so intimately alloyed or related to the iron that only an excess of chlorin will remove it. It is desirable that the chlorin be introduced in as cool condition as practicable.

For the further guidance of those practising our invention we make reference to our Letters Patent No. 1,086,921, granted February 10, 1914, which sets forth an apparatus suitable for the performance of the present process.

The resulting stannic chlorid may be removed by the means set forth in our said application, (Patent No. 915,029) or in various other ways.

We claim as our invention:—

1. The recovery of tin from tin scrap by treating the latter in a closed vessel with dry lorin to form stannic chlorid, and passing through the vessel such a surplus of chlorin above the amount necessary for the reaction that the heat generated by the reaction is absorbed by the large amount of cool gas and the temperature thereby kept below the point at which the iron is attacked.

2. The recovery of tin from tin scrap by treating the latter in a closed vessel with dry chlorin to form stannic chlorid, and passing through the vessel such a surplus of chlorin that the heat generated by the reaction is absorbed by the large amount of cool gas and the temperature thereby kept below the point at which the iron is attacked.

3. The recovery of tin from tin scrap by treating the latter in a closed vessel with dry chlorin to form stannic chlorid, and passing over the scrap within the vessel such a large amount of cool gas that the temperature is thereby kept below the point at which the iron is attacked.

4. The recovery of tin from tin scrap by treating the latter in a closed vessel with dry chlorin to form stannic chlorid, and maintaining within the vessel such an active flow of chlorin that the heat generated by the reaction is absorbed, and the temperature thereby kept below the point at which the iron is attacked.

5. The recovery of tin from tin scrap by treating the latter in a closed vessel with dry chlorin to form stannic chlorid, and causing such a large amount of cool gas to flow over the scrap that the temperature is thereby kept below the point at which the iron is attacked.

6. The recovery of tin from tin scrap by treating the latter in a closed vessel with dry chlorin to form stannic chlorid, and maintaining within the vessel such an active flow of chlorin and so cooling the chlorin that the heat generated by the reaction is absorbed and the temperature of the scrap thereby kept below the point at which the iron is attacked.

In witness whereof, we have hereunto signed our names in the presence of two subscribing witnesses.

FRANZ VON KÜGELGEN.
GEORGE O. SEWARD.

Witnesses:
HARRY R. LEE,
J. H. WEBB

Copies of this patent may be obtained for five cents each, by addressing the "Commissioner of Patents, Washington, D. C."